(12) United States Patent
Bates et al.

(10) Patent No.: US 7,496,666 B2
(45) Date of Patent: Feb. 24, 2009

(54) MULTI-USER COMPUTER SYSTEM

(75) Inventors: Philip Bates, Yorks (GB); John Richard Anderson, Chandlers Ford (GB); John Aloysius McDermott, West Byfleet (GB)

(73) Assignee: Raritan Americas, Inc., Somerset, NJ (US)

( * ) Notice: Subject to any disclaimer, the term of this patent is extended or adjusted under 35 U.S.C. 154(b) by 0 days.

(21) Appl. No.: 11/325,607

(22) Filed: Jan. 3, 2006

(65) Prior Publication Data

US 2006/0173996 A1    Aug. 3, 2006

(51) Int. Cl.
G06F 15/173    (2006.01)
G06F 15/16    (2006.01)

(52) U.S. Cl. .................... 709/226; 709/208; 709/224

(58) Field of Classification Search .............. 709/224, 709/227, 223, 226, 238, 208; 713/182; 726/34; 345/156, 168

See application file for complete search history.

(56) References Cited

U.S. PATENT DOCUMENTS

| | | | |
|---|---|---|---|
| 3,634,830 A | 1/1972 | Baskin |
| 3,774,158 A | 11/1973 | Clark |
| 3,955,188 A | 5/1976 | Viswanathan |
| 4,078,249 A | 3/1978 | Lelke et al. |
| 4,081,797 A | 3/1978 | Olson |
| 4,150,429 A | 4/1979 | Ying |
| 4,243,984 A | 1/1981 | Ackley et al. |
| 4,313,176 A | 1/1982 | Cecil |
| 4,479,122 A | 10/1984 | Redman et al. |
| 4,550,386 A | 10/1985 | Hirosawa et al. |
| 4,599,611 A | 7/1986 | Bowker et al. |
| 4,630,284 A | 12/1986 | Cooperman |
| 4,641,262 A | 2/1987 | Bryan et al. |
| 4,665,501 A | 5/1987 | Saldin et al. |
| 4,680,622 A | 7/1987 | Barnes et al. |
| 4,710,917 A | 12/1987 | Tompkins et al. |
| 4,754,326 A | 6/1988 | Kram et al. |
| 4,768,083 A | 8/1988 | Romesburg |
| 4,800,429 A | 1/1989 | Perkins |

(Continued)

FOREIGN PATENT DOCUMENTS

EP    0 430 673    6/1991

(Continued)

OTHER PUBLICATIONS

International Search Report for Application No. PCT/GB98/03214, International Filing date Oct. 28, 1998.

(Continued)

*Primary Examiner*—Andrew Caldwell
*Assistant Examiner*—Benjamin A Ailes

(57) ABSTRACT

A system for connecting multiple users to multiple computers uses a switch for making and breaking connections between individual computers and input/output devices such as display screens, keyboards and pointing devices at user locations. A supervisory computer system includes one or more helper computers which run programs to aid the user in selecting connections to be made. The switch is arranged to capture preselected input sequences as designating commands, such as a command to connect the helper computer, and to forward these to the supervisory computer system. The supervisory computer system actuates the switch in response to these commands so that the user can establish communication with the helper computer.

39 Claims, 9 Drawing Sheets

U.S. PATENT DOCUMENTS

| | | | |
|---|---|---|---|
| 4,807,184 A | 2/1989 | Shelor | |
| 4,814,972 A * | 3/1989 | Winter et al. | 709/227 |
| 4,823,256 A | 4/1989 | Bishop et al. | |
| 4,879,716 A | 11/1989 | McNally et al. | |
| 4,907,079 A | 3/1990 | Turner et al. | |
| 4,939,507 A | 7/1990 | Beard et al. | |
| 4,941,087 A | 7/1990 | Kap | |
| 4,949,169 A | 8/1990 | Lumelsky et al. | |
| 4,949,248 A | 8/1990 | Caro | |
| 4,953,027 A | 8/1990 | Tong et al. | |
| 4,953,159 A | 8/1990 | Hayden et al. | |
| 5,029,111 A | 7/1991 | Mansell | |
| 5,036,484 A | 7/1991 | McCoy et al. | |
| 5,043,866 A | 8/1991 | Myre, Jr. et al. | |
| 5,051,720 A | 9/1991 | Kittirutsunetorn | |
| 5,117,225 A | 5/1992 | Wang | |
| 5,121,486 A | 6/1992 | Kurihara et al. | |
| 5,128,766 A | 7/1992 | Choi | |
| 5,166,674 A | 11/1992 | Baum et al. | |
| 5,214,785 A | 5/1993 | Fairweather | |
| 5,220,380 A | 6/1993 | Hirata et al. | |
| 5,222,212 A | 6/1993 | Johary et al. | |
| 5,230,066 A | 7/1993 | Morimi | |
| 5,247,364 A | 9/1993 | Banker et al. | |
| 5,247,615 A | 9/1993 | Mori et al. | |
| 5,260,778 A | 11/1993 | Kauffman et al. | |
| 5,261,079 A | 11/1993 | Celi, Jr. | |
| 5,268,676 A | 12/1993 | Asprey et al. | |
| 5,280,583 A | 1/1994 | Nakayama et al. | |
| 5,283,639 A | 2/1994 | Esch et al. | |
| 5,287,461 A | 2/1994 | Moore | |
| 5,301,028 A | 4/1994 | Banker et al. | |
| 5,317,391 A | 5/1994 | Banker et al. | |
| 5,327,156 A | 7/1994 | Masukane et al. | |
| 5,341,477 A * | 8/1994 | Pitkin et al. | 709/226 |
| 5,347,646 A | 9/1994 | Hirosawa et al. | |
| 5,349,675 A | 9/1994 | Fitzgerald et al. | |
| 5,357,276 A | 10/1994 | Banker et al. | |
| 5,357,420 A | 10/1994 | Gohi | |
| 5,367,571 A | 11/1994 | Bowen et al. | |
| 5,381,477 A | 1/1995 | Beyers, II et al. | |
| 5,392,400 A | 2/1995 | Berkowitz et al. | |
| 5,396,593 A | 3/1995 | Mori et al. | |
| 5,421,009 A * | 5/1995 | Platt | 709/221 |
| 5,440,618 A | 8/1995 | Riegel et al. | |
| 5,440,632 A | 8/1995 | Bacon et al. | |
| 5,448,697 A | 9/1995 | Parks et al. | |
| 5,465,105 A | 11/1995 | Shatas et al. | |
| 5,477,262 A | 12/1995 | Banker et al. | |
| 5,485,221 A | 1/1996 | Banker et al. | |
| 5,486,868 A | 1/1996 | Shyu et al. | |
| 5,486,869 A | 1/1996 | Cooper | |
| 5,489,947 A | 2/1996 | Cooper | |
| 5,499,377 A | 3/1996 | Lee | |
| 5,502,499 A | 3/1996 | Birch et al. | |
| 5,504,522 A | 4/1996 | Setogawa | |
| 5,519,874 A | 5/1996 | Yamagishi et al. | |
| 5,526,024 A | 6/1996 | Gaglianello et al. | |
| 5,534,942 A | 7/1996 | Beyers, Jr. et al. | |
| 5,537,548 A | 7/1996 | Fin et al. | |
| 5,539,822 A | 7/1996 | Lett | |
| 5,577,210 A | 11/1996 | Abdous et al. | |
| 5,579,057 A | 11/1996 | Banker et al. | |
| 5,579,087 A | 11/1996 | Salgado | |
| 5,581,303 A | 12/1996 | Djabbari et al. | |
| 5,583,993 A | 12/1996 | Foster et al. | |
| 5,592,551 A | 1/1997 | Lett et al. | |
| 5,603,060 A | 2/1997 | Weinberger et al. | |
| 5,604,509 A | 2/1997 | Moore et al. | |
| 5,606,604 A | 2/1997 | Rosenblatt et al. | |
| 5,608,872 A | 3/1997 | Schwartz et al. | |
| 5,617,547 A | 4/1997 | Feeney et al. | |
| 5,642,153 A | 6/1997 | Chaney et al. | |
| 5,657,414 A | 8/1997 | Lett et al. | |
| 5,674,003 A | 10/1997 | Anderson et al. | |
| 5,689,671 A | 11/1997 | Stromberg | |
| 5,701,161 A | 12/1997 | Williams et al. | |
| 5,708,961 A | 1/1998 | Hylton et al. | |
| 5,715,515 A | 2/1998 | Akins, III et al. | |
| 5,719,622 A | 2/1998 | Conway | |
| 5,721,842 A | 2/1998 | Beasley et al. | |
| 5,724,525 A | 3/1998 | Beyers, II et al. | |
| 5,732,212 A | 3/1998 | Perholtz et al. | |
| 5,742,677 A | 4/1998 | Pinder et al. | |
| 5,768,224 A | 6/1998 | Tanaka et al. | |
| 5,774,859 A | 6/1998 | Houser et al. | |
| 5,801,789 A | 9/1998 | Ziedler et al. | |
| 5,812,784 A * | 9/1998 | Watson et al. | 709/227 |
| 5,828,843 A * | 10/1998 | Grimm et al. | 709/228 |
| 5,884,096 A | 3/1999 | Beasley et al. | |
| 5,937,176 A | 8/1999 | Beasley et al. | |
| 6,128,660 A * | 10/2000 | Grimm et al. | 709/227 |
| 7,146,417 B1 * | 12/2006 | Coile et al. | 709/224 |

FOREIGN PATENT DOCUMENTS

| | | |
|---|---|---|
| EP | 0 174 099 | 7/1993 |
| TW | 654229 | 9/1991 |
| WO | WO 87/00317 | 1/1987 |
| WO | WO 94/19749 | 9/1994 |
| WO | WO 95/01055 | 1/1995 |
| WO | WO 96/17286 | 6/1996 |
| WO | WO 97/08625 | 3/1997 |

OTHER PUBLICATIONS

Dekerf, Tony and Gary Davis, The Keyboard/Video Switch White Paper: A Close Look at Modern Keyboard/Video Switching, Tron International, Inc., Apr. 20, 1995.

Rose Electronics Product Catalog, pp. 10, 11, 24-27, Jun. 1993.

The PolyCon Management System One for All and All For One Product Catalog, PolyCon GmbH Data Systems, 1994.

Installation Notes for RCI Burn-In Master (BM10), Raritan Computer Taiwan, Inc., Apr. 11, 1989.

The International Preliminary Examination Report and Written Opinion, in the corresponding PCT application No. PCT/GB98/03214.

Two European Examination Reports, in the related European patent application No. 98951566.3.

The European Search Report in the related European patent application No. 02005033.2.

Two Canadian Office Actions in the related Canadian patent application No. 2,308,325.

The Australian Office Action dated Dec. 20, 2002 in the related Australian patent application No. 97182/01.

* cited by examiner

MULTI-USER COMPUTER SYSTEM

CROSS REFERENCE TO RELATED APPLICATIONS

The present application claims benefit of U.S. provisional patent application 60/063,695 filed Oct. 28, 1997 the disclosure of which is hereby incorporated by reference herein.

FIELD OF THE INVENTION

The present invention relates to computer systems, and more particularly relates to systems in which plural users can interface with plural computers.

BACKGROUND OF THE INVENTION

Various computer systems allow a user to employ a computer at a remote location. For example, some mainframe computer systems support remote terminals connected to the mainframe computer by dedicated lines or by other communications links. As the computing power available in small computers referred to as personal computers or "PCs" has increased, many applications previously performed on mainframe systems has been transferred to PCs. In many cases, PCs are connected to one another, to larger computers or both through networks which allow the transfer of information among the various computers. Thus, a user at any location can run programs on his or her own computer using files taken from other computers on the network, and also can run programs on other computers.

While this approach offers numerous advantages, it also suffers from certain disadvantages. Maintaining all of the individual computers at dispersed locations takes considerable time and effort. The dispersed computers and their components are vulnerable to theft and damage. Moreover, controlling software updates on all of the various computers and assuring that each individual computer has the appropriate software presents a significant challenge. This challenge is especially significant in environments such as software development laboratories where the software to be used is changing continually. Moreover, the requirement that a computer be present in the immediate vicinity of the user means that the user must put up with the noise and heat generated by the computer and means that the computer will occupy some of the space which would otherwise be available at the user's desk. This latter drawback is especially annoying to users who must employ several computers at once as, for example, some securities and commodities traders.

Various proposals have been advanced to alleviate these problems. For example, as disclosed in U.S. Pat. No. 5,721,842, input devices such as a keyboard and mouse and output devices such as a display monitor and speaker may be provided at numerous user locations. These devices are connected to signal conditioning circuits or "pods", which in turn connect to a crosspoint switch. Numerous computers are also provided. The computers are connected through other "pods" to other terminals of the crosspoint switch. The crosspoint switch is arranged to connect any of the pods associated with user locations to any of the pods associated with the computers, so that each user can be connected to any computer. These connections include both digital connections for passage of input signals such as keyboard and mouse data to the computer and analog connections for video signals sent by the computer. Thus, the user can operate the remote computer in much the same manner as a user having a keyboard, mouse and display screen directly linked to the computer. In order to allow the user to select different computers, the system provides a processor within each pod at each user location. This processor recognizes special command keystroke sequences entered by the user, formats these commands and transmits the commands over separate command data lines to the crosspoint switch. The pod contains a rudimentary program which actuates the monitor to display a menu of the available commands when the user enters the beginning of the command sequence on the keyboard.

This approach suffers from several serious drawbacks. The pods can at most display rudimentary lists of commands. This offers little or no guidance to the user in selecting appropriate computers to connect with for specific purposes. Moreover, it is difficult to control access by specific users to specific computers. Further, the need for separate command channels extending through the user locations, as well as the need for even rudimentary programmability and display generation capabilities at the user locations significantly increase the cost and complexity of the system. Thus, despite significant efforts heretofore in the development of multi-user, multi-computer systems, there still remains a considerable need for improvement in such systems.

SUMMARY OF THE INVENTION

The present invention addresses these needs. One aspect of the present invention includes a method of interfacing a plurality of server computers with input and output devices at a plurality of user locations. A method according to this aspect of the invention includes the step of conveying input signals from input devices such as keyboards which are included in sets of input and output ("I/O") devices at user locations to server computers associated with the user locations and conveying output signals from such server computers to output devices as, for example, display monitors included in the sets at the user locations. A method according to this aspect of the invention desirably further includes the step of detecting one or more predetermined helper codes in the input signals and connecting a helper computer to the set of input and output devices at the user location in response to the helper code. Typically, the helper computer is connected to the particular set of I/O devices which sent the helper code. The method further includes the step of running a program in the helper computer which interacts with the set of I/O devices connected to the helper computer and allows the user at such set to select one or more of the server computers for connection or disconnection. Additionally, the method includes the step of actuating a switch to connect or disconnect server computers as selected during operation of the interactive program for the input and output devices at one or more of the user locations. Most commonly, the interactive program run by the helper computer will allow a user at a particular location connected to the helper computer to select one or more of the server computers for connection or disconnection to that particular user location. Thus, a user can select computers for connection to his own location. In a variant, the program on the helper computer can allow the user to select computers for connection to other user locations.

Methods according to this aspect of the invention can greatly simplify the task of the user. Thus, the program on the helper computer can take advantage of all of the techniques used by modern programmers to provide a user-friendly environment. For example, the helper computer may run the program in an environment such as a Windows® operating system which provides a graphical user interface. The helper computer program can present information about the available servers in any desirable manner as, for example, by presenting the servers organized in groups according to the types of programs available on each server or other criteria which are meaningful to the user. Moreover, the helper computer can obtain this list of servers from a database at a central location which can be maintained using conventional database management techniques.

The helper computer program desirably includes routines for determining user identities as, for example, password identification utilities which require the user to enter an indication of his identity coupled with a secret password associated with that identity. Thus, the database may include information defining access rights for particular users or groups of users and the helper computer program may control access to servers according to the access rights set forth in the database. These capabilities can be provided using conventional programming techniques in the helper computer or another computer connected to the helper computer, whereas they would be difficult or impossible to provide without the use of the helper computer. Moreover, because only one or a few helper computers are required, and because these helper computers can be located at a centralized location along with the server computers and the switch, it is relatively easy to maintain the helper computers and to assure physical security of the entire system.

Most preferably, each helper computer is connected into the switch in much the same manner as a server computer, so that the switch can connect each helper computer to any of the user locations. The switch itself desirably is controlled by a supervisory computer system. Typically, but not necessarily, the supervisory computer system includes a separate switch control in addition to the helper computer or computers. The switch control computer may be connected to the helper computer by a connection independent of the switch as, for example, a local area network so that the helper computer can pass information to define desired connections or disconnections to the switch control computer. The helper computers can be managed dynamically as a resource, so that requests for use of the helper computers can be queued and passed to the next available helper computer.

Desirably, the method further includes the step of detecting action codes other than the helper codes in the input data supplied by the user and actuating the switch to make or break connections between servers and sets of input and output devices at user locations in response to the action codes without using the interactive program running on the helper computer. For example, the switch control computer can be arranged to respond to the action codes independently of the helper computer and can be arranged to recognize the helper codes and can actuate the switch to connect the helper computer in response to the helper codes. The use of the action codes minimizes the system overhead involved with simple tasks. For example, the system desirably maintains a running set of servers associated with each user location. This running set includes a few particular servers which have been selected through use of the interactive program on the helper computer. An action code may allow the user to move through this set one server at a time and thus allow the user to "toggle" between servers of the running set. Thus, the helper computer is not involved where it is not needed.

The computers used to supervise operation of the system may be arranged to record information about usage of the various servers. For example, the system can record the identities of users who access particular servers and the times of such access. Moreover, the switch control computer may be arranged to monitor faults in components of the system and to disable defective arts so as to preserve security of the system.

A further aspect of the present invention provides a system for interfacing a plurality of server computers with output and input devices at a plurality of user locations. This system includes a switch selectively operable to connect the server computers with output and input devices at user locations so that any one of the server computers can be associated with a set of devices at user locations and so that the associated servers and devices are connected to another through the switch. This allows users at the user location to interact with the associated server computers. The system according to this aspect of the invention also includes a supervisory computer system. The supervisory computer system is connected to the switch so that the supervisory computer system can control operation of the switch. In this aspect of the invention, the supervisory computer system desirably includes a helper computer operative to run a program as discussed above, for selecting one or more of the server computers for association with a set of input and output devices at a user location. The switch is selectively operable to associate the helper computer with a set of input and output devices at a user location and connect the input and output devices to the associated helper computer. The system according to this aspect of the invention also includes code recognition devices connected to receive the input signals sent by the input devices. The code recognition devices are operative to detect one or more predetermined helper codes in the input signals and to pass the helper codes to the supervisory computer system. The supervisory computer system is arranged to instruct the switch to connect the set of input and output devices which sent the helper code to the helper computer. Thus, users at the user locations can selectively interact with the helper computer to select server computers as discussed above in connection with the method.

Apparatus according to a further aspect of the invention provides a system for connecting plural I/O devices at plural user locations to selected computers in a plurality of server computers. Apparatus according to this aspect of the invention includes a plurality of server ports adapted for connection to server computers and a plurality of user ports adapted for connection to input devices, together with a switch for selectively associating user ports and server ports so that input device signals supplied to a user port by an input device connected thereto can be conveyed to an associated server port and to a server connected to such server port. The apparatus further includes code recognition devices associated with the user ports. The code recognition devices are operated to detect one or more command codes in input signals supplied to the user ports and to provide a code output including code data representing such command codes and address data representing the identity of the user port carrying the input signals in which the command code was detected. Most preferably, the code recognition devices are disposed at a central location, such as within the switch itself. Thus, command codes may be sent along with the input data, in the same data stream, to the central location. There is no need for a separate set of conductors to carry the command data. The command codes may include the helper codes and action codes as discussed above in connection with other aspects of the invention, and the system may also include devices such as a supervisory computer system for controlling the switch in response to the command codes.

The ability of the system to operate without extra communication lines to the user locations interchange of the command codes simplifies construction of the system and allows installation at reduced cost.

The one or more code recognition devices desirably includes a plurality of user interface processors each connected to a subset including one or more of the user ports. Most preferably, each user interface processor is associated with only one user port. The system may further include at least one control processor and, for each control processor, a control data channel connecting a set of the user interface processors with such control processor. This connection is arranged so that each user interface processor can send code data representing a command code to the control processor and so that the control processor can identify the particular user interface processor which sent such command code data. For example, each control processor can be connected to the associated user interface processors through a time division multiplex control data link, so that each user interface processor sends any command codes in a predetermined timed slot of the multiplexed transmission scheme. The control processor appends address data to each command code based upon the identity of the user interface processor. Where there is more than one control processor, the control processor may assign part of the address data based on the identity of the control processor itself. Thus, the address data accompanying each item of code data representing a command code identifies the particular user port where the command code was detected. This allows the supervisory computer system or switch to act on the command data depending upon the identity of the user port. For example, where the command data indicates that the user port which originated the command should be connected to the helper computer, the supervisory computer system can establish the appropriate connection of the helper computer to the correct user port.

Yet a further aspect of the invention provides methods of operating a plurality of server computer from a plurality of user locations which includes the steps of sending input data in a data stream along with command codes from input devices at user locations to user ports at one or more central locations where data from several users is concentrated. The method further includes the step of detecting command codes at the central locations, forwarding the command codes to a supervisory computer; forwarding the input data from the user locations through a switch to one or more of the server computers; and actuating the switch in response to some or all of the command codes to change connections between the server computers and the devices at the user locations. Here again, because the command codes are detected at the central location where data from several user location is concentrated, there is no need for separate command data lines.

In a particularly preferred arrangement, the connections between the central location or locations and the user locations can be made through eight conductors constituting three twisted pairs for red, green and blue video signals, and another pair of conductors for bi-directional communication of input signals and command data from the input devices at the user to the central location and reverse data as, for example, for controlling characteristics of the user interface devices. These eight conductors can be connected, for example, with standard eight position connectors such as RJ45 telephone-type connectors and conventional wiring of the types used for computer networks.

These and other objects, features and advantages of the invention will be more readily apparent from the detailed description set forth below, taken in conjunction with the accompanying drawings.

Figure 1:
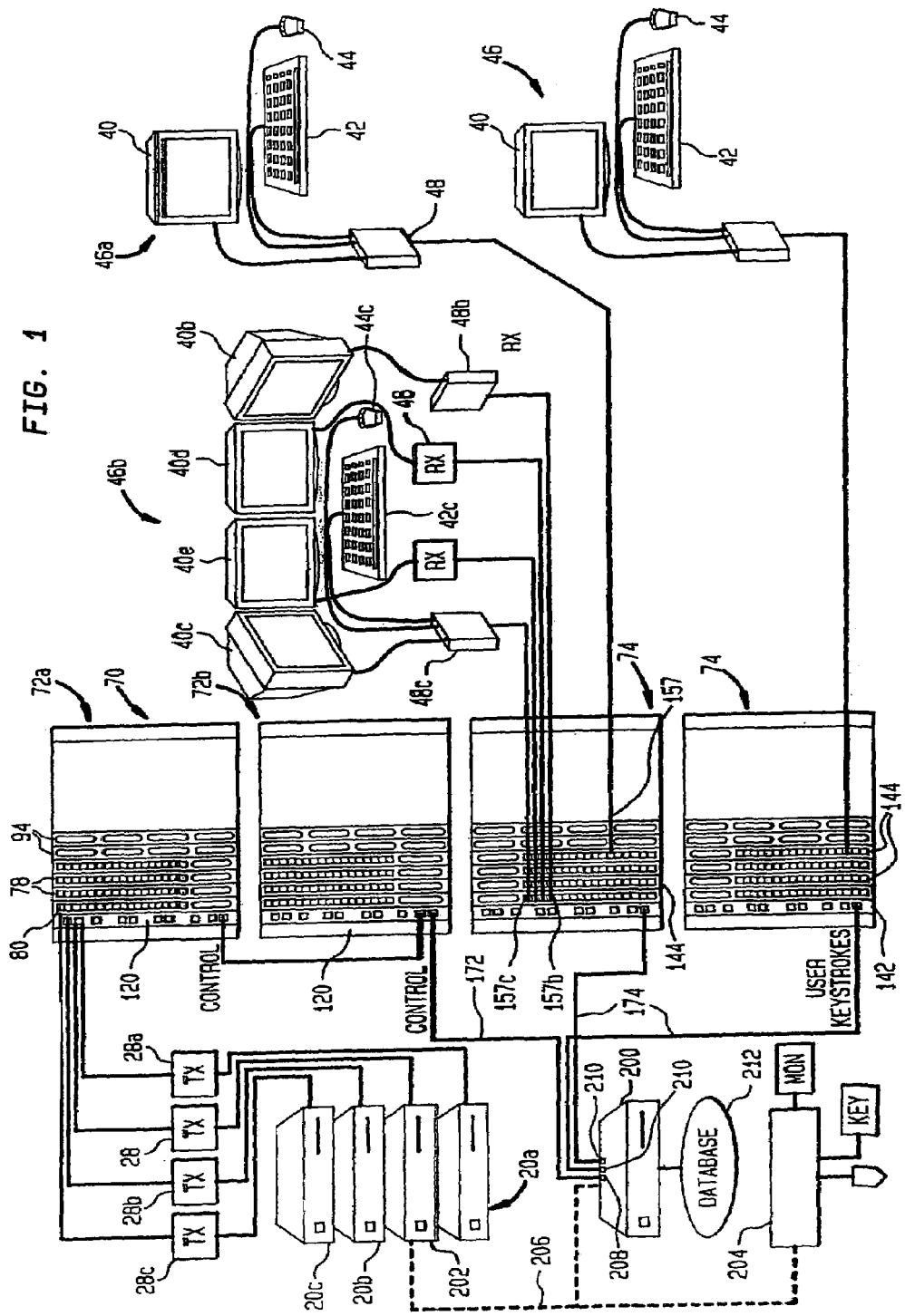
FIG. 1 is a diagrammatic view depicting apparatus used in one embodiment of the invention.

Each of FIGS. 3, 4, 5, 6, 7 and 8 is a further diagrammatic view illustrating additional components of the apparatus depicted in FIG. 1.

Figure 8:
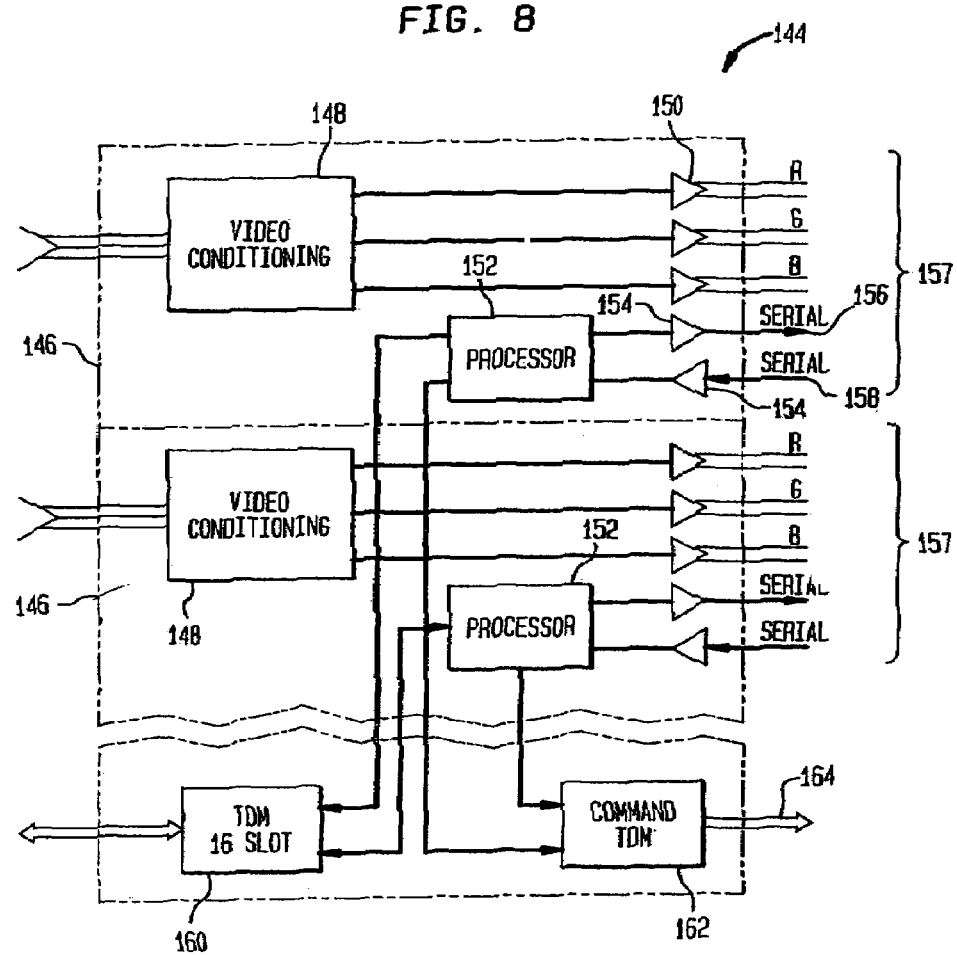
Figure 9:
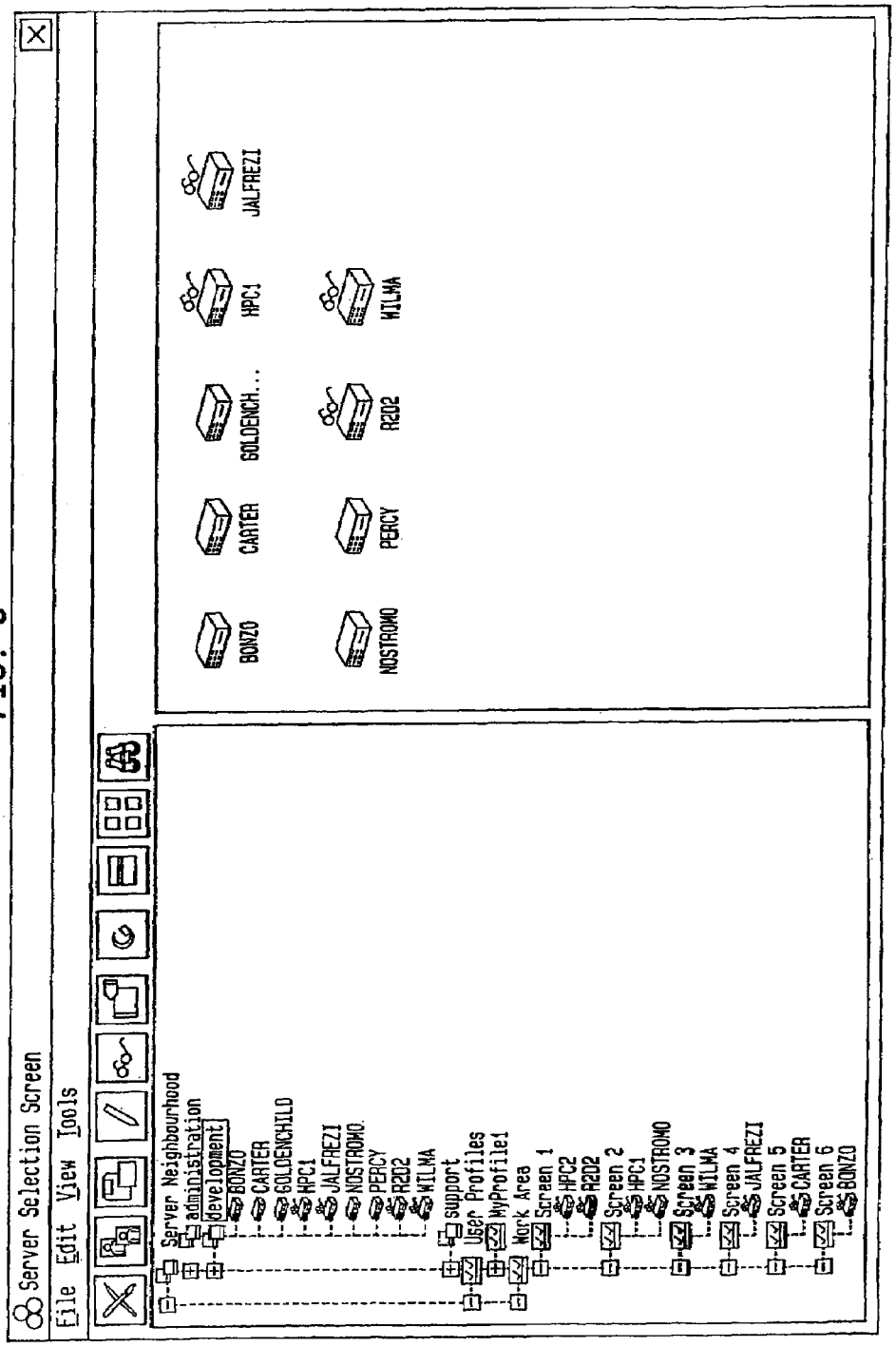

FIG. 9 is a representation of a screen display used in one program employed in operation of the apparatus in FIGS. 1-8.

Figure 10:
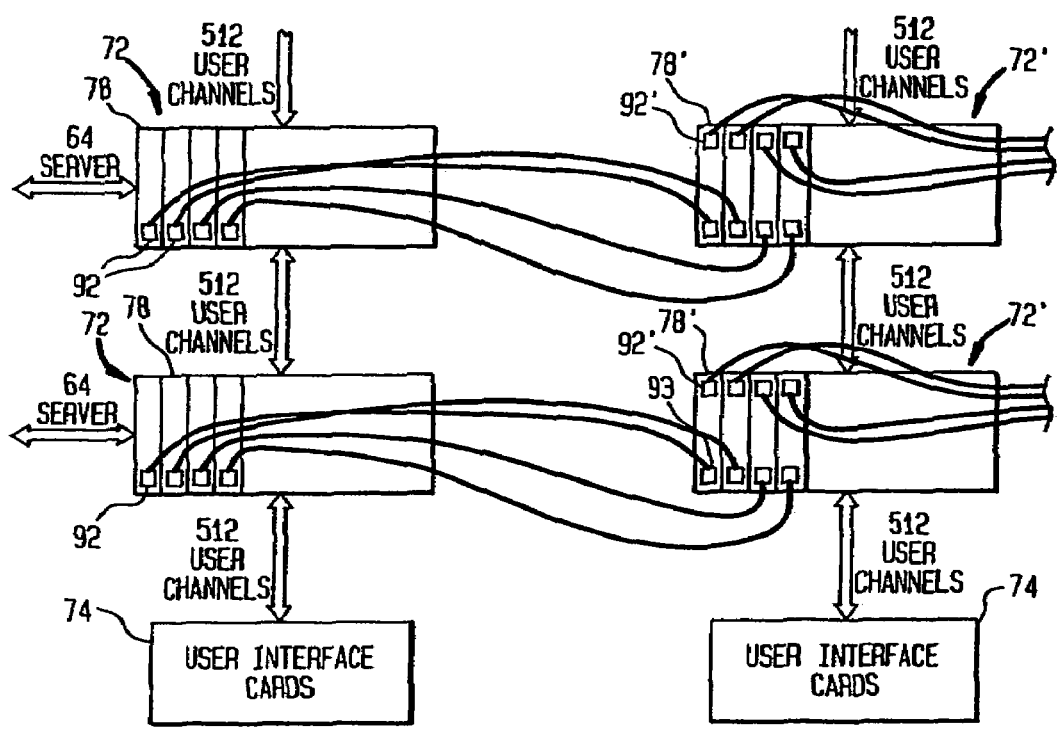

FIG. 10 is a diagrammatic view depicting a system in accordance with a further embodiment of the invention.

DETAILED DESCRIPTION OF THE PREFERRED EMBODIMENTS

A system in accordance with one embodiment of the invention includes a plurality of computers 20 referred to herein as servers. Although only a few server computers 20 are depicted in FIG. 1, it should be appreciated that a typical system typically will include tens or even hundreds of server computers. Each computer 20 includes all of the internal components normally found in a personal computer as, for example, central processing units, memory storage devices such as disk drives and all of the components used for connecting these elements with one another. These internal elements of the server computer may be of any conventional type. Also, some or all of these server computers may include optional components such as data communications cards, modems, and the like for connecting the server computers or devices outside of the system. Each computer 20 includes a conventional VGA video output connection 22 (FIG. 3), keyboard connection 24 and mouse connection 26. The computer is arranged in the conventional manner to receive keyboard inputs through connection 24 and also to provide some keyboard control signals as, for example, signals which control the status of indicator lights for caps lock, number lock and scroll lock lamps on the keyboard. Similarly, the computer is arranged to receive mouse inputs at connection 26 and to send mouse control signals through the same connection. These connections are arranged in the conventional manner, normally used with standard keyboards and mice. The VGA output connection 22 is arranged to provide video output in the VGA format accepted by conventional monitors. The VGA format includes separate analog RGB (red, green, blue) color signals, each of 0.7 volts peak to peak with separate horizontal and vertical synchronization signals on different signal lines. The synchronization signal polarity differs depending on the screen resolution. In ordinary use of a personal computer, connections 22, 24 and 26 are connected to a monitor, keyboard, and mouse, respectively, in the immediate vicinity of the computer, typically within about a meter or less. The signals provided at these ports, and particularly the VGA video signal are not well suited to long distance transmission.

Each server computer 20 is connected to a device 28 referred to herein as a transmitter. Each transmitter is located in close proximity to the associated computer, typically within a meter of the computer. Transmitters 28 may be housed within the computers themselves or else may be housed in a separate chassis holding a few transmitters connected to server computers in the immediate vicinity of such separate chassis. Transmitters 28 may be conventional devices used for adapting the VGA output from the computer to a format suitable for long-distance transmission. Each transmitter is also arranged to adapt the keyboard and mouse connections 24 and 26 to send and receive data in a format which is also suited for long-distance transmission. Devices of this nature are well known in the art. One such device is commercial available under the trademark FreeDesk Transmitter from CCC Group, PLC of Farnbrough, Hants, United Kingdom and from CCC USA, Inc. of Melville, N.Y., USA. The FreeDesk Transmitter includes a video conditioning circuit 30 and a set of three differential output amplifiers 32. These elements cooperate to convert each of the red, green and blue color signals in the incoming VGA signal into a pair of output signals having opposite polarities. The pair of video signals representing each color is provided at the output of one output amplifier 32. The video conditioning circuit also serves to impress the horizontal synchronization signal onto the pair of output signals representing the red video signal. A combined horizontal and vertical synchronization signal is applied on the pair of outputs representing the green video signal, whereas a signal representing the polarity of the original VGA synchronization signal is combined with the pair of signals representing the blue video component. Transmitter 28 also includes a microprocessor 32 connected to the keyboard and mouse connection 24 and 26 of the computer. The microprocessor is connected to an outgoing serial data connection 34 and incoming serial data connection 36 which provide a duplex serial data communication link. The microprocessor combines control signals sent by the computer through the keyboard and mouse connections 24 and 26 into an outgoing serial data stream provided on this duplex link. The microprocessor is arranged to extract keyboard and mouse data from an incoming data stream on the same duplex link and to route the incoming data to the keyboard and mouse ports 24 and 26.

The three pairs of analog color signals from amplifiers 32 and the serial data connections 34 and 36 are connected at eight pin positions in a standard RJ45 telephone-type jack, as shown in Table I.

| PIN | USAGE |
| --- | --- |
| 1 | Red video − HS, 2 volts p-p |
| 2 | Red video + HS, 2 volts p-p |
| 3 | Current serial multiplex send |
| 4 | Green video − CS, 2 volts p-p |
| 5 | Green video + CS, 2 volts p-p |
| 6 | Current serial multiplex receive |
| 7 | Blue video − composite polarity, 2 volts p-p |
| 8 | Blue video + composite polarity, 2 volts p-p |

The system also includes a set of output devices, typically monitors 40 and input devices such as keyboards 42 and mice or other pointing devices 44. These I/O devices are disposed at numerous user locations 46. Although only a few user locations 46 are depicted in FIG. 1, it should be appreciated that a typical system may include tens or even hundreds of user locations. Typically, user locations 46 are dispersed as, for example, throughout a building. The set of input and output devices disposed at each user location is arranged in groups. Each group may be a full group, incorporating a single monitor 40, a single keyboard 42 and a single mouse or other pointing device 44, or else may be a partial group omitting one or more of these devices. Typically, at least one full group is provided at each user location. For example, user location 46A has only a single full group, whereas user location 46B has a full group and three partial groups, each such partial group including only a monitor 40. Each group of input and/or output devices is associated with a protocol converter referred to herein as a receiver (RX) 48. Receiver 48 has an RJ45 jack 50 with connections corresponding to the connections in the jack of the transmitter. The receiver further includes differential input amplifiers 54 connected to the pairs of inputs on jack 50. These input amplifiers are connected to a video conditioning circuit 56. The video conditioning circuit is arranged to reverse the transformation provided by the video conditioning circuit 30 of the transmitter and to provide a standard VGA output signal at an output connection 58. Receiver 48 further includes microprocessor 60 connected to a keyboard input jack 62 and a mouse input jack 64. The microprocessor is also connected to two pins 66 and 68 which serve as the serial input and serial output respectively of the receiver. The microprocessor is arranged to accept keyboard input data from a standard keyboard 42 and mouse input data such as movement and button click data from a standard mouse 44 and to provide such data in a serial format on the duplex communication link provided by connections 66 and 68. The microprocessor is also arranged to accept keyboard and mouse control data on the duplex communication link and send such control data to keyboard 42 and mouse 44. The features of the receiver 48 may be identical to those used in the well known and commercially available FreeDesk (trademark) Receiver. In the well-known FreeDesk system, a jack 38 of a particular computer can be connected to the jack 50 of a receiver 48 using wiring having four twisted pairs as, for example, high-grade wiring of the type commonly referred to category 5 568B cable extending over tens or of meters, typically up to about 200 meters. When the transmitter and receiver are connected in this manner, the user can operate the computer using the group of I/O devices connected to the receiver 48. Operation of the FreeDesk system is transparent to the user; the user can interact with the computer in substantially the same way as he or she could interact with a computer at his or her location connected directly to the keyboard, mouse and monitor. The same type of connection can be used to provide a part of the interface. For example, where the output of a computer is to be displayed at the users location, but input from the user at that location is not desired, a monitor can be connected to the VGA output of the receiver 48, whereas the keyboard 42 and mouse 44 may be omitted. The system further includes a switch 70 (FIGS. 1 and 2) in addition to the FreeDesk transmitters and receivers. Switch 70 includes a set of server interface chassis 72 and a set of user interface chassis 74. Here again, only a few of these components are shown in the drawings for clarity of illustration; typically, a large number of server interface chassis and a large number of user interface chassis are provided. Each server interface chassis 72 includes a backplane 76 with a 64-channel video bus 76a providing connections for 64 red, green and blue video signals, i.e., 192 individual color signals arranged in triplets. Each backplane 76 also includes a data bus 76b with connections for four bi-directional time division multiplexed ("TDM") data channels. These data channels are operated with sixteen time slots per channel in each direction, and hence the data bus can accommodate 64 bi-directional data channels. The backplane further includes a control data serial bus 76c. The backplane further includes power lines (not shown) for powering the various cards held by chassis 72, as well as slot address pins (not shown) which interact with each card in the chassis, to designate a unique card address for each card.

Figure 5:
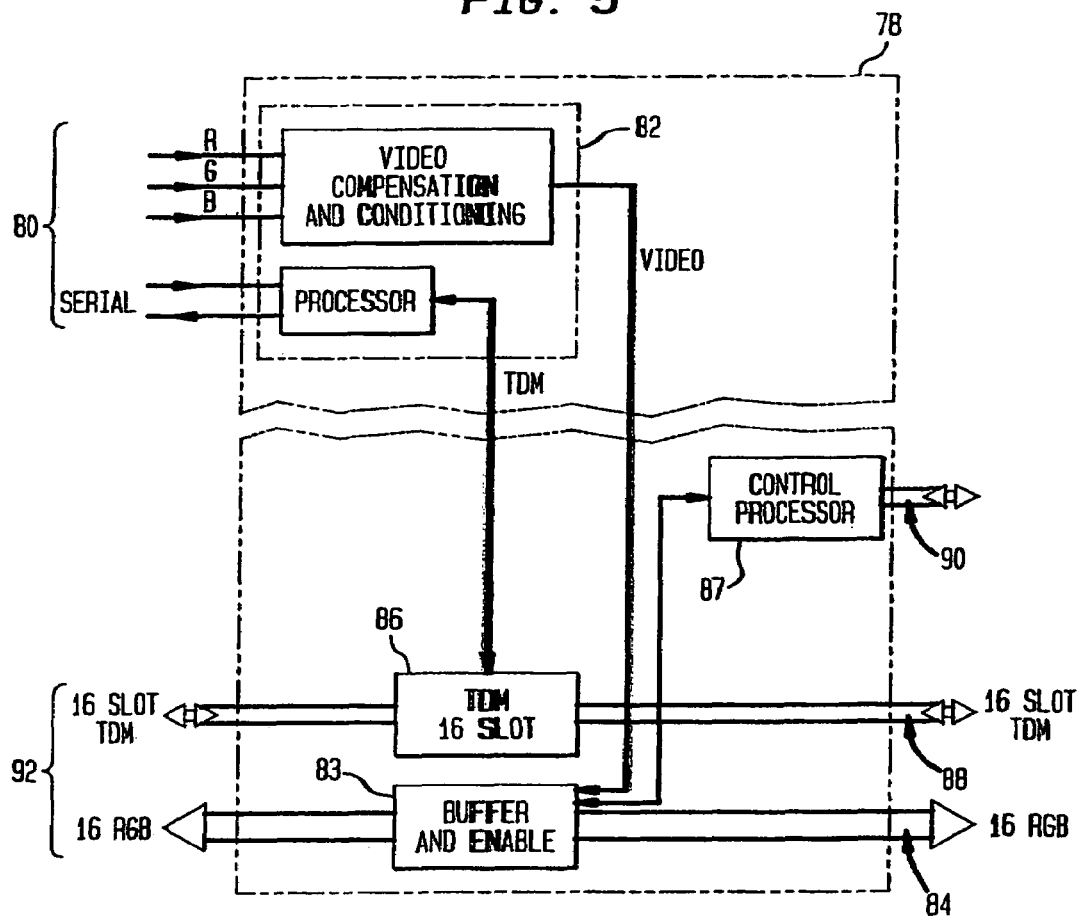
Figure 6:
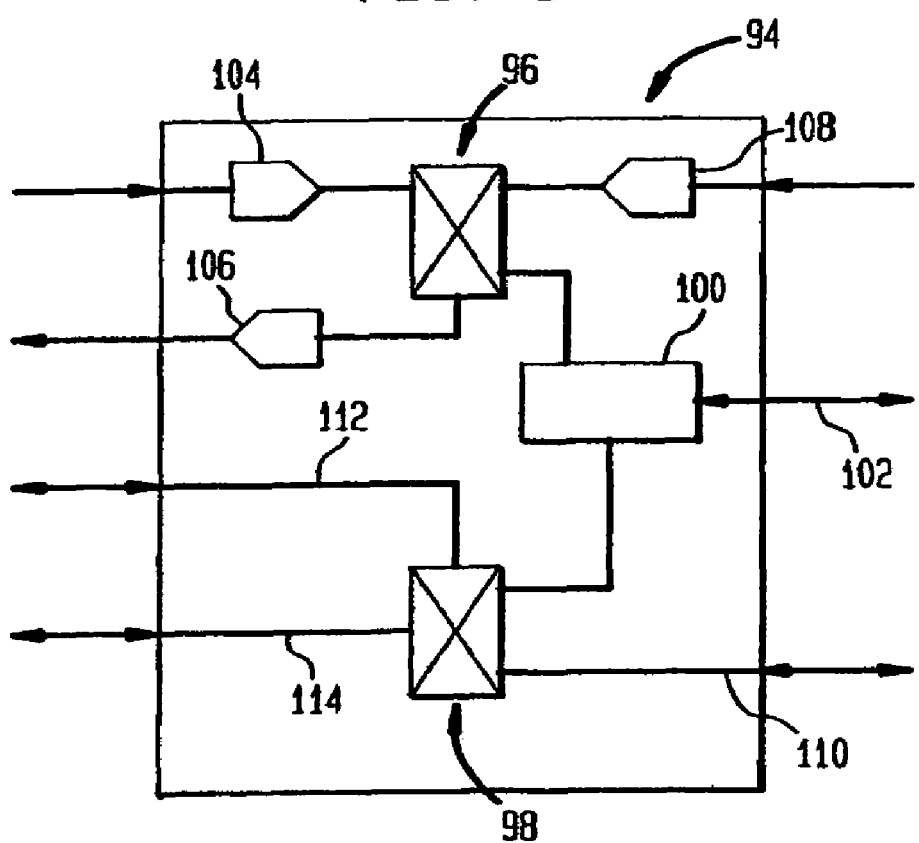
Figure 7:
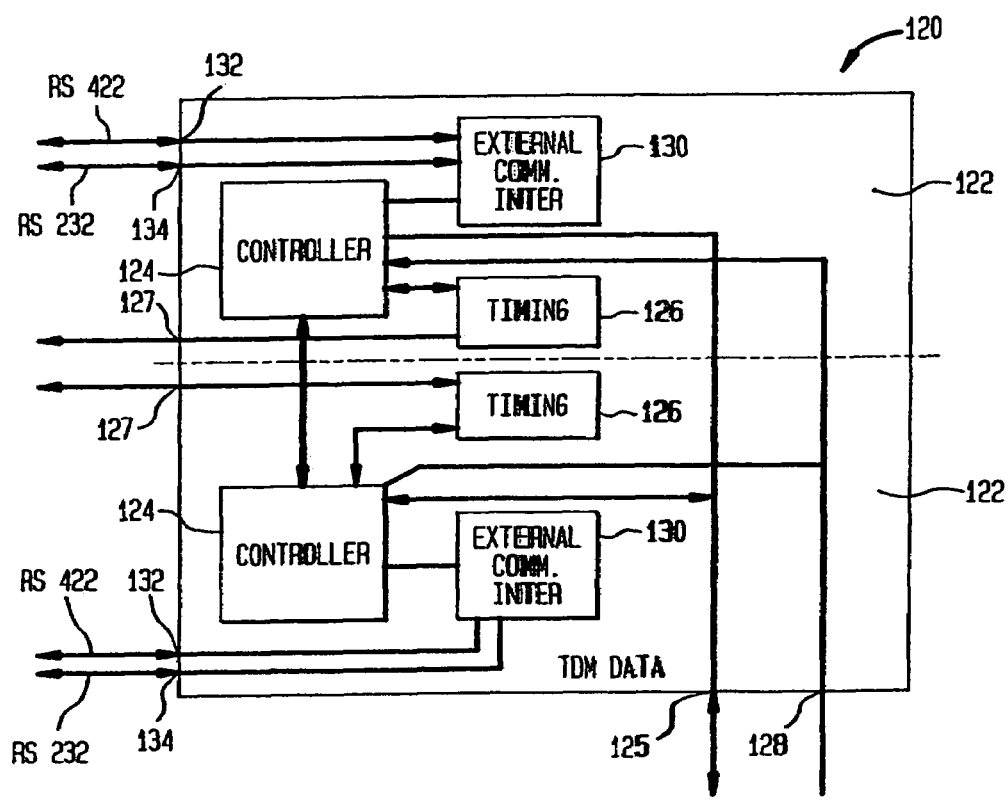

Each server interface chassis 72 has up to four server interface cards 78 mounted therein. Each server interface card is arranged to accept and send control signals and status information on control bus 76c through a control data connection 90. Each of the server interface cards includes sixteen RJ45 type jacks or server input ports 80, of which only one is shown in FIG. 5. In use server input ports 80 are connected to the output connectors 38 of transmitters 28 (FIG. 1). Each of the server input ports 80 is connected to a server port interface circuit 82, which includes a microprocessor and video conditioning circuitry. Each server port 80, and the associated circuit 82 have a unique address within the chassis 72. Thus, the ports on the first card 78 are at intra-chassis server port addresses 1-16; those on the second card are at addresses 17-32, and so on. The video conditioning circuit is adapted to convert each of the differential analog color signal pairs (red, green and blue) to a corresponding single signal, and to compensate for line losses and delays in the analog circuitry conveying the signal to the port. The microprocessor included in each server port interface circuit 82 is arranged to convert between serial and TDM data formats. The analog video signals of all sixteen interface circuits 82 are connected through a buffer and selective enabling circuit 83 to a sixteen channel RGB video backplane connector 84, which in turn is connected to sixteen of the video channels 76a of the backplane. Circuit 83 is also arranged to enable or disable video transmission from each port 80 to the connector 84 in response to control signals addressed to that circuit from a control processor 87. Control processor 87 in turn is connected to the control bus of the backplane through the control data connection 90 of the server interface card. As further discussed below, other components selectively make or break video connections with the video channels 76a of the backplane so as to connect the video from individual servers to the desired users. The video connection from each port 80 to the connector 84 and hence to the backplane video x channels 76a could remain enabled at all times. However, the connection to the backplane of those video channels which are not connected to any user is disabled so as to save power and reduce noise on the backplane.

The server interface card 78 further includes a multiplex circuit 86. The multiplex circuit is connected to the processor in each of the interface circuits 82. The processor in each of the interface circuits 82 captures serial data transmitted into the port 80 and sends the same to multiplex circuit 86. The multiplex circuit is arranged to send the data captured from the various serial signals passing through the interface circuits in time division multiplex format, in a single bi-directional TDM channel with 16 bi-directional TDM slots, through connection 88, such that the data from each server port 80 is sent in a particular time slot of the TDM transmission scheme. Similarly, the time division multiplex circuit 86 is arranged to accept time division multiplex data on connection 88 and to send data in a particular time slot of the TDM transmission scheme to a particular interface circuit 82 and server port 80 associated with that particular time slot.

The server interface card 78 is connected to the backplane 76 of a server interface chassis 72 so that the sixteen channel video connector 84 of each card 78 is connected to sixteen of the sixty-four video channels on the backplane. Thus, each port 80 is coupled to the video channel corresponding to the intra-chassis address of that port. Also, the TDM data connection 88 of each card 78 is connected into one of the four TDM data channels of the backplane so that the serial data connections of each server port 80 are connected to the corresponding TDM slot on the backplane. For example, the port with intra-chassis address 17 is coupled to that 17th video channel of bus 76D and to the 17th TDM slot of TDM data channels 76b.

Each server interface card 78 further includes an expansion connection 92. The expansion connection carries buffered replicates of the incoming video signals and also carries a TDM data channel including the 16 bi-directional TDM slots as carried by data connection 88. As discussed below, the expansion connection can be used to connect additional server interface chassis into the system. The video signals to expansion connection 92 are always enabled.

Each server interface chassis 72 also includes up to 16 matrix cards 94. Each matrix card 94 includes an analog switching circuit 96; a digital switching circuit 98 and a controller 100. Controller 100 may include one or more microprocessors connected through a control port 102 to receive control signals on the control bus 76c of backplane 76. Each matrix card 94 includes a 32 channel video input connector 104 and a 32 channel video output connector 106. These connectors are arranged to handle 32 channels of RGB video signals. The matrix card further includes a 64 channel video backplane connector 108 adapted to connect the 64 channel RGB video bus 76a of the backplane with the analog switching circuit 96. Appropriate buffer amplifiers (not shown) are also associated with the input connectors 108 and 104 and with the output connector 106. The matrix card 94 further includes a four channel TDM backplane connection 110 adapted to mate with the data TDM 76b of the backplane in the server chassis 72; a dual 16 slot TDM input connection 112 providing 32 TDM data slots in all; and a similar, dual 16 slot output connection 114. The TDM connections 110, 112 and 114 are linked to digital crosspoint controller 98.

The analog switching circuit 96 may include a set of crosspoint switching devices such as twenty-four AD8116 16×16 Crosspoint Video Switches having inputs connected to backplane connector 108 and having outputs connected to the channels of output connector 106, together with additional switches for selectively connecting each channel of input connector 104 to the corresponding channel of output connector 106. As further discussed below, the analog switching circuit 96 can connect any of the 32 output video channels on output connector 106 with any of the 64 video channels from the backplane at connector 108, or with any of the thirty-two video channels from the video input connector 104. Similarly, the digital switching circuit includes a set of switching devices which may incorporate a pair of I-Cube 96 Way Keyboard and Mouse Switches connected to TDM backplane connection 110 and to the TDM output connection 116. Circuit 98 can associate any of the 32 bi-directional slots provided by the two outgoing TDM channels at output 114 with any of the sixty-four TDM slots available on the backplane or with any of the thirty-two TDM slots available at the input connection 112.

Each server interface chassis 72 also includes a controller card 120. Each controller card includes two identical halves 122. Each half of the controller card incorporates a controller 124, desirably an 80×86 microprocessor such as an 80186 microprocessor of the type available from the Intel Corporation. The two microprocessors 124 are connected to one another so that each can monitor the status of the other. When power is first applied to the controller card, the two microprocessors compete for control of the system; the first one of the two microprocessors which completes its power-on sequence wins control. The half 112 of the card having the winning microprocessor 124 remains active, whereas the other half remains inactive but continues to perform a check on the first half. However, upon a failure or fault condition, in the active half of the card, the inactive half takes over, and the other half enters the fault-checking mode.

Each half of the card includes a clock or timing circuit 126 arranged to produce clock and framing signals as needed for time division multiplex communications. Timing circuits 126 are connected to timing ports 127. Each half of the card also includes appropriate communications interfaces (not shown) adapted to connect the microprocessor or controller 124 with the control data bus 76C (FIG. 2) of the backplane through a control data port 125. Each half also includes a keystroke TDM data port 128 and appropriate interface devices (not shown) for routing TDM data received at port 128 to the microprocessor 124. The keystroke TDM data port is not used in those control cards which are installed in server interface chassis. Each half of the card also includes an external communications interface or serial interface 130 connected to an RS422 serial data port 132 and an RS232 standard serial data port 134. As further discussed below, the controller card associated with each server interface chassis 72 is arranged to receive command signals from a switch control computer through the RS422 serial port and is further adapted to interpret these commands and use the interpreted commands to control the server interface cards and matrix cards in the chassis.

Figure 2:
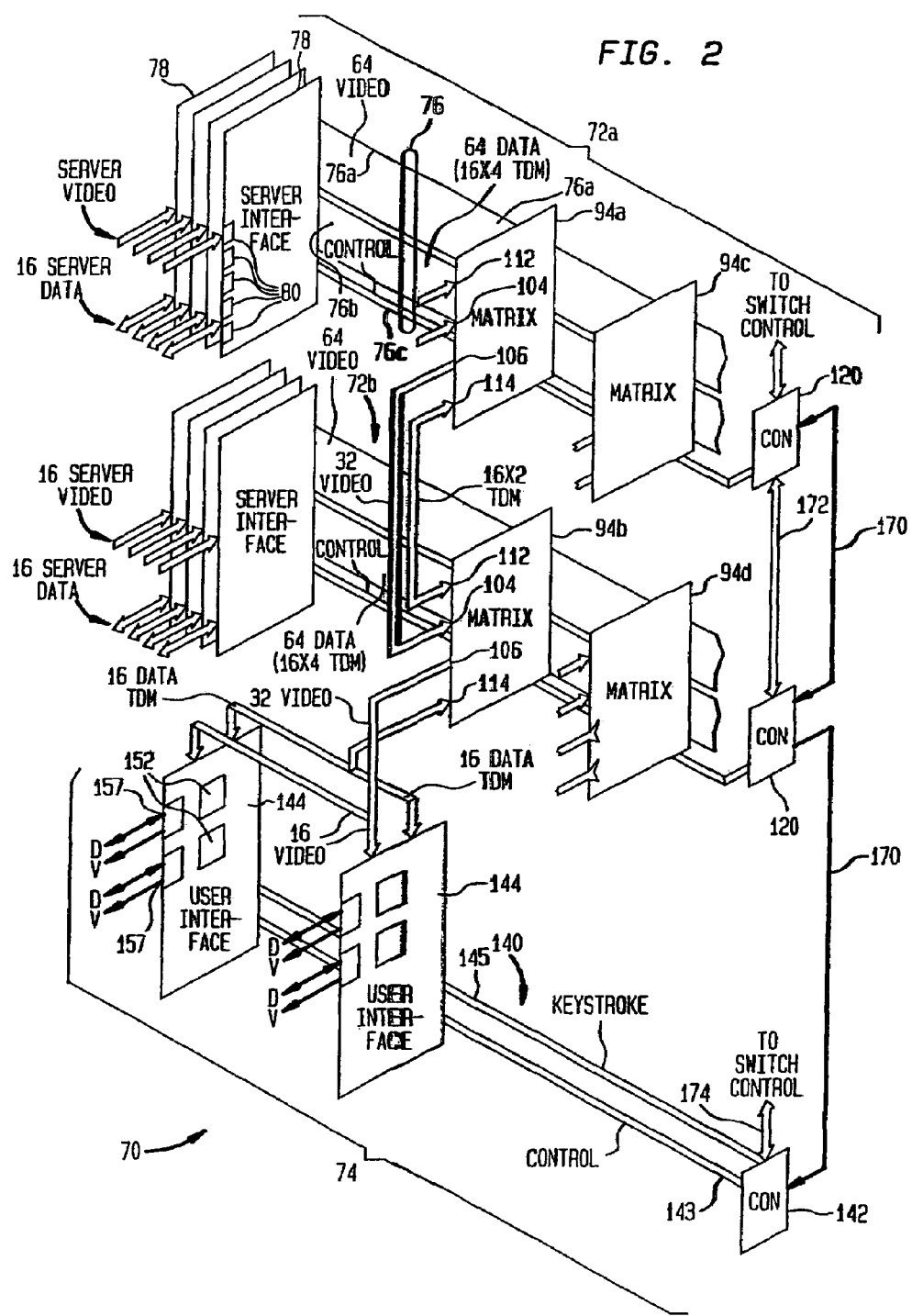
FIG. 2 is a further diagrammatic view illustrating certain components of the apparatus depicted in FIG. 1.
Figure 3:
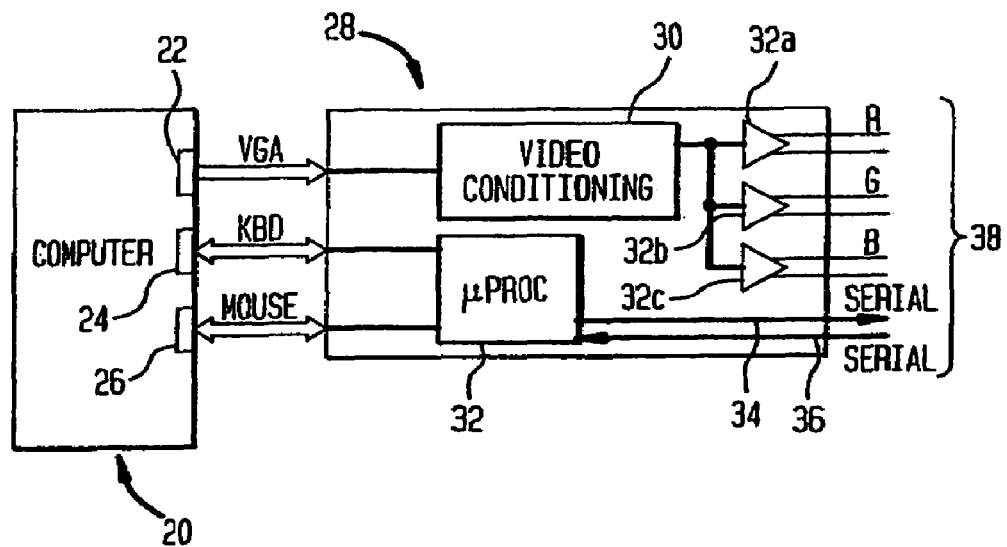
Figure 4:
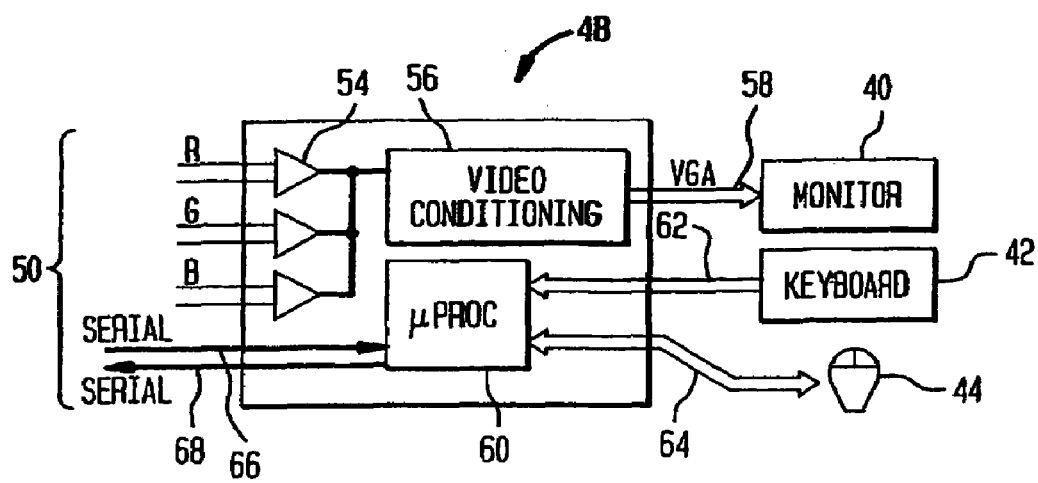

Each user interface chassis 74 includes a backplane 140 having power connectors (not shown), a control bus 143 and a 16-slot TDM channel 145 referred to as the keystroke TDM channel. (FIG. 2). Each backplane 140 also provides slot address pins (not shown) for providing the various cards inserted in the backplane with hard-coded slot addresses. Each user interface chassis is provided with a control card 142 identical to the control cards 120 discussed above with reference to the server interface chassis. The control data port 125 of the control card is connected to the control data bus 143 of the backplane, whereas the keystroke data port 128 of the control card is connected to the keystroke data bus 145.

Each user interface chassis also accommodates up to twenty user interface cards 144. Each user interface card 144 incorporates sixteen channel circuits 146, of which only two are shown in FIG. 8 for clarity of illustration. Each channel circuit includes video conditioning circuitry 148 and output amplifiers 150. The video conditioning circuitry is arranged to accept RGB video in the format provided by matrix cards 94 and to realign the red, green and blue components with one another based upon the synchronization signals in these components. The video conditioning circuit is also arranged to adjust the gains of these various components based upon the size of the sync pulses in the various components. Thus, the video conditioning circuit restores the timing and relative intensities of the red, green and blue signals, thereby compensating for any differences in signal propagation times and amplitude gain in other components of the switching system. The video conditioning circuit and amplifiers 150 provide the outgoing video signal as a set of three opposite polarity signal pairs on terminals of a user port 157 having the same pin assignments as indicated in Table I, above. Each channel 146 also includes a microprocessor connected to buffer amplifiers 154 to a serial send terminal 156 and a serial receive terminal 158 of user port 157. The microprocessor 152 of each channel desirably is a PIC model 16C622, made by Microchip Technology, of Chandler, Ariz.

The processors 152 of the various channels 146 are connected to a time division multiplex interface 160. Interface 160 is arranged to receive a sixteen channel time division multiplex data stream from one of the matrix cards 94 and to divert signals in each of the sixteen channels to a particular processor 152 in a particular data channel 146 associated with that slot. Interface 160 is also arranged to accept data from the processor 152 of each channel and send that data in the appropriate slot of the time division multiplex transmission scheme.

The user interface card includes a further time division multiplex interface 162 having a connection 164 that mates with the control lines 143 of the user interface chassis 74 (FIG. 2). The processor 152 of each channel 146 is arranged to examine data arriving on serial input 158, and to recognize preselected command codes appearing in that data. Preferably, processor 152 is arranged to recognize a predetermined attention sequence such as the key press code for alt-break and to treat a preselected number of characters following the attention sequence as a command data. For example, the processor may be arranged to treat the key press appearing immediately after the attention sequence as the command data. Each processor 153 is arranged to strip the command code (attention sequence and command data) out of the data before forwarding the data to TDM interface 160. Each processor 152 diverts the command data to interface 162. As discussed in greater detail below, the data arriving at each processor 152 on the serial input line 158 is raw scan code data encoded by the keyboard itself. Keyboard scan codes for standard keyboards are widely known in the art and are available in standard keyboard technical reference manuals. For example, using a PS/2 keyboard, each key press generates a particular keyboard scan code when the key is pressed down and generates the same scan code preceded by a delimiter byte (0XF0) when the key is released. Thus, the processor 152 of each channel is arranged to recognize the key press sequence corresponding to Alt-break as an attention sequence, and to divert a preselected number of key press sequences following the attention sequence to TDM interface 162.

Each channel 146 and each port 157 has a unique address within the chassis. The TDM interface is arranged to send the raw keystroke data diverted by each processor 152 as command data in a TDM slot corresponding to the intra-chassis address of the channel 146 where the data was captured, i.e., the intra-channel address of the processor 152 and user port 157 where the command code was captured.

The various server interface chassis 72 and user interface chassis 74 are interconnected with one another as shown in FIGS. 1 and 2. The timing devices of the various control cards on the server interface chassis and user interface chassis are interconnected with one another by timing patch cords 160. As noted above, the various control cards have two halves with one clock in each half. The interconnections between the various control cards connect one clock on each card in one set of clocks ("clock A") and another clock on each card in a separate set ("clock B"). Within each set, one clock is set by internal jumpers to be a master and the other clocks are slaved to this master. The cards all use one clock set and ignore the other unless the first set fails. The clock signals are used to provide synchronization of the various time division multiplex signals on the various chassis. Stated another way, all of the transmission and reception times associated with the various time slots in the various time division multiplexing schemes are set with reference to a common clock, so that TDM signals sent by a circuit on one chassis can be received and understood by circuits on another chassis. The RS422 serial communication ports of the control cards 120 in the server interface chassis 72 are connected to one another so as to provide a common server interface serial link 172. The RS422 serial ports of each control card 142 in each user interface chassis 74 are connected as a separate user interface serial line 174. The control card 120 in each server interface chassis is programmed with a designation indicating that the card is part of a server interface chassis rather than part of a user interface chassis, and with a chassis address designating the particular server interface chassis. Likewise, the control card 142 of each user interface chassis 74 is programmed with a designation indicating that the card is incorporated in a user interface chassis and with a user interface chassis address number. The matrix cards 94 in the various server interface chassis are connected to one another patch cords so as to form columns of matrix cards extending across all of the server interface chassis. For example, matrix 94A and 94B form one such column whereas cards 94C and 94D form another column. Within each vertically extensive column, the video input 104 of each matrix card is connected to the video output 106 of the next higher card in the column. Likewise, the bi-directional TDM channel inputs 112 of each matrix card in the column is connected to the TDM output 114 of the next higher matrix card in the column. The interconnections between the cards in the column thus provide thirty-two user video channels extending vertically across all of the server interface chassis and 32 user slots of bi-directional TDM communication (two channels, each 16 slots) also extending across all of the server interface chassis. Each of the matrix cards can configure any particular user video channel or data slot either as a feed through from the input 104 of that matrix card, in which case the channel will connected to the next higher matrix card in the column. Alternatively, each matrix card can connect a particular video channel to a video channel on the backplane of that particular chassis. Thus, any of the thirty-two user video channels provided by each column of matrix cards can be connected to any of the video channels 76a on the backplane of any of server interface chassis 72. In the same manner, any of the user TDM slots can be connected to any of the TDM slots 76b provided on the backplane of any server interface chassis. The user video channels and user TDM slots defined by the columns of matrix cards are arranged in order. Thus, the first column of matrix cards defines user video channels 1-32 and user TDM slots 1-32; the second column defines video channels 33-64 and user TDM slots 33-64 and so on.

At the bottom of each column, the thirty-two user video channels and thirty-two user TDM slots are split into two paths, each including sixteen user video channels and sixteen bi-directional user TDM slots. Each path is connected to one user interface card 144. Each of the sixteen user video channels is connected to the video input of one channel 146 on the user interface card and hence is connected to the video output of one user port 157. Also, the sixteen user TDM slots are interfaced through the TDM processor 160 of the user interface card so that each such user TDM slot is connected to the serial inputs and outputs of a particular user interface port. Thus, each of the thirty-two user video channels and thirty-two TDM slots defined by a vertically extensive column of matrix cards is connected to a single user port. As discussed above, each of the user ports 157 has an intra-chassis address. Each user port also has an overall address Thus, a user port 157 having intra-chassis address IUA in the $i^{th}$ user chassis has overall user address OUA=IUA+(Q×(i−1)), where Q is the number of user ports per user interface chassis, i.e., the highest intra-chassis address for a fully-configured chassis. In the system depicted in the drawings, which includes up to 20 user interface cards, each with 16 user ports, in each user interface chassis, Q=320. Each of the user video channels and user TDM slots is connected to the output port having an overall address corresponding to the channel number and slot number, i.e., the $n^{th}$ video channel and $n^{th}$ user TDM slot are connected to the user port having overall address OUA=n.

Similarly, each of the server ports 80 has an overall server port address OSA based on the intra-chassis server port address ISA. That is, for a server port in the $i^{th}$ server interface chassis, OSA=ISA+(Z×(i−1)) where Z is the maximum number of server interface ports per server interface chassis. For example, in the system shown in the drawings, each server interface chassis can accommodate up to 64 server interface ports, and hence Z=64. A server port 80 having intra-chassis address 10 in the second of the interface chassis has overall address 10+(64×(2−1)) or 74. As discussed in greater detail below, the matrix cards can connect the serial data connections 156 and 158 of any user port 157 to the serial data connections of any server input port 80 on any of the server interface chassis. Similarly, the matrix cards can connect the video outputs in any user output port 157 to the video inputs of any server port 80. Such a connection can be specified completely simply by designating whether the connection is to be a video connection or a data connection, and by designating the overall addresses of the server port and user port which are to be connected.

The system further includes a supervisory computer system which includes a switch control computer 200; one or more helper computers 202 and one or more administration computers 204. The helper computers 202 and administration computers 204 most preferably are separate computers, distinct from the switch control computer 200. The helper computers, administration computers and switch control computers are interconnected to one another in a local area network 206 separate from the switch 70. Desirably, the various computers run under an operating system which is readily integrated with a local area network such as Microsoft® Windows NT Server, version 4.0 or higher. All the various computers desirably are part of a single Windows NT domain. Each helper computer 202 is also connected to a server input port 80 of switch 70 through a transmitter 28 in exactly the same way as server computers 20. The switch control computer is equipped with a server control serial interface 208 connected to the server interface chassis serial line 172. The switch control computer 200 is also provided with individual serial interfaces 210 connected to the individual serial communications lines 174 associated with the control cards of user interface chassis 74. As further discussed below, the switch control computer 200 acts as the server in LAN 206. For that reason, the switch control computer is sometimes referred to as a "switch server". A database 212 is also provided on local area network 206. Because database 212 is utilized by the switch control computer or switch server 200, the database is depicted in FIG. 1 as physically associated with the switch control computer. However, the database may be maintained either on the switch control computer itself or on another computer connected to LAN 206. The database may be maintained using a standard database administration program such as Microsoft® SQL Server, version 6.5. The switch control computer or "switch server" also runs a main program which performs the various operations discussed below. This program consists of various modules each of which are responsible for their own tasks. For instance, one module listens on the communications ports 210 connected to the user interface cards. The program uses multi-threading; one thread is maintained for each user location. When an incoming command from a user location is detected, it is handed to the relevant thread which represents each user location. The work area thread then calls the functions corresponding to the required action. Each thread can also request resources such as a Helper PC or an open database connectivity or "ODBC" link to the database and these are managed by other modules such as the Helper PC manager and ODBC manager which will allocate and de-allocate the required resources as necessary.

The database includes data defining identities for particular servers 20 and helper computers 202 connected to the system as, for example, names for such servers and helper computers. The database also includes data defining associations between particular servers and helper computers and particular server ports 80 on the server interface chassis. The database further includes information about particular user locations or work areas 46, such as the number of receivers 48 at each such location; whether the group of I/O devices associated with each such receiver includes input devices such as keyboard 42 and mouse 44; output devices such display monitors 40; or both and a user port address for each receiver.

The database desirably further includes information about each authorized user of the system such as a user name; a password and data defining access rights to particular servers 20 for each user. This data may be provided as an individual list of particular servers authorized for each user. Alternatively or additionally, each user may be defined as belonging to one or more user groups, whereas each server may be defined as belonging to one or more server groups, and rights may be allocated on a group-wide basis. The database may also include a temporary list defining a running set of servers for each user location.

In operation, when the system is started, all of the I/O devices at user locations 46 are initially disconnected from the server computers 20 and from helper computer 202. A user at a particular location as, for example, at location 46A may enter a startup helper code (alt-break followed by enter). This code is passed through the serial output 68 (FIG. 4) of the receiver 48 associated with the user's keyboard and is passed into the serial input 158 of the particular user port 157 connected to that receiver 48. The processor 152 associated with that port 157 (FIG. 8) responds to the attention sequence (alt break) by trapping the next key stroke indication (enter) and forwarding that keystroke indication to the command TDM module 162. The TDM module sends the command data indicating depression of the enter key in a particular slot of the TDM transmission from the particular card associated with intra-chassis address of that channel. Thus, if the processor which trapped the helper code was the processor for the has an intrachassis address IUA, the the signal sent along the keystroke bus 145 to the control card 142 (FIG. 2) of the user interface chassis will appear in a transmission uniquely identified with intra-chassis address IUA. The processor 124 of the control card 142 adds the intra-chassis address within the chassis to the starting address of the chassis to compute the overall user port address OUA. The controller formulates a message including the overall user port address and the particular key stroke included in the data (in this case, the enter key) and transmits that message along the serial communications link 174 to one of the serial interfaces 210 of switch control computer 200. Communications between the control cards and the serial ports of switch control computer use an ANSI X3.28 compliant packet communications protocol. As is well known in the art, communications of this nature include features such as message acknowledgment and, in some cases, a check sum for error correction, so as to provide a robust communications link with good assurance that errors in communication will be detected. The switch control computer 200 interprets the message conveying the overall user port address together with a enter key stroke value as a request to connect the input devices (keyboard and mouse) and output device (monitor) associated with that user port to a helper computer in a sign-on mode. The switch control computer checks the database for helper computers, finds a helper computer which is not currently occupied, and finds the server port address for that helper computer.

The switch control computer then broadcasts a signal on the server interface chassis serial control line 172 through communications port 208, again using the ANSI X3.28 protocol. The command includes a video connect signal including a code predesignated as meaning "Connect video" together with two integers (X and Y), so that the overall command has the meaning "CONNECT VIDEO X Y" where X is the overall server port address of the helper computer and Y is the overall user port address which sent the helper command. The computer also sends a command of the meaning "CONNECT KEY X Y" where X and Y have the same meanings. The control cards 120 of the various serial interface chassis 72 all receive these commands. Each controller will compare the server port address within each command to the range of overall server port addresses included in that server interface chassis. The controller card in a server interface chassis having a range of overall server port addresses including X will acknowledge the command, whereas the other controller cards will ignore it. The controller card which acknowledges a CONNECT VIDEO command converts the overall server port address to an intra-chassis server port address based on the starting port address of the chassis. For example, the second server interface chassis starts with overall server port address 65. Therefore, if the overall server port address "70" is indicated by the X value in a CONNECT VIDEO command, the control card in the second server interface chassis will respond to the command and will select the sixth server port 80 of that chassis. Thus, the control card will select the sixth of the 64 video channels on the backplane of the chassis and will actuate the sixth of the 64 video server interface circuits 82 to route video from its port unto the video channel of the backplane. The control card will also select the particular matrix card encompassing the user video channel corresponding to the user port address designated by the value of Y in the command. The control card will send a message to the matrix card including that user video channel instructing it to connect the particular user channel or slot to the particular video channel on the backplane. For example, in response to the response to the command "CONNECT VIDEO 70 35", the control card associated with the second server interface chassis will cause the second matrix card to connect the third one of its video outputs (the video output associated with the 35th user video channel) onto the sixth video channel of the backplane in the server interface chassis (the video channel associated with overall server port address "70"). The matrix cards maintain continuity between video inputs 104 and video outputs 106 in the absence of specific instructions. Thus, the video coupled onto any user video channel or slot at a particular server interface chassis is transmitted through the matrix cards disposed beneath it on other server interface chassis. Video coupled onto a user video channel is transmitted down the channel to the particular channel 146 of the user interface card and to a particular user port 157 associated with the user video channel. Thus, the video from a particular server port X is coupled to the video output of a particular user port Y. In a directly analogous manner, the control cards 120 and the matrix cards respond to the command "CONNECT KEY X Y" by connecting a particular time division multiplex slot in a backplane data channel 76B associated with a particular server port 80 designated by the server port address X with the serial input and output connections 156 and 158 of the particular user port designated by the user port address Y.

As pointed out above, the message sent by the control card of the user interface chassis 74 to switch control computer 200 tells the switch control computer which user port originated the helper command. The switch control computer uses that port as the user port address in the CONNECT VIDEO and CONNECT KEY commands and thus connects the helper computer to the user port which originated the helper command. The switch control computer 200 also sends a message over the LAN to the helper computer advising the helper computer of the identity of the user port, and advising the helper computer that the user at such port wishes to connect to the helper computer in the sign-on mode.

At this point, the user is connected to the helper PC 202 through a receiver 48; through a user port 157 and switch 70 to a server port 80 associated with the helper PC 202 and through the transmitter 28 associated with the helper PC. The monitor 40 at the user's location shows output from the helper PC, whereas the keyboard and mouse are connected to the keyboard and mouse connections of the helper PC, so that the user can interchange data with the helper PC in exactly the same manner as if the monitor, keyboard and mouse were directly connected to the corresponding connections of the helper PC 202.

In the sign-on mode, the helper computer enters an initial access routine in which it generates a screen display calling for the user to enter his or her user ID and password.

Upon authentication of the user's identity and password, the helper PC accesses the database to obtain the list of servers authorized for access by that user. The helper PC also and also accesses information in the database setting forth a correlation between user port addresses and user locations to find the configuration of the input and output devices at the user's particular location, and the user port addresses associated with various groups of devices. The helper PC displays a list of authorized servers and F the input output devices. The helper PC accepts input from the user defining particular servers to be connected to particular I/d devices. One example of a display which may be generated by the helper PC is shown in FIG. 9. The list of servers is presented under the heading "Server Neighborhood". This list includes only those servers which are authorized for access by the particular user. Note that the servers are identified by names rather than by port number. Also, only those servers authorized for access by the particular user are displayed. Where the servers are arranged in groups, the display of available servers may also be grouped. Also, the available groups of input and output devices at the user location are displayed under the heading "Work Area". Here again, the available I/O devices are designated on the display by names which are intelligible to the user, rather than by user port numbers associated with the devices. Each group of input and output devices at the user's location is shown by a separate designation such as "screen 1", "screen 2", etc. Each such group has one receiver 48 and is associated with one user port 157 of switch 70. The user can designate one or more of the available servers for association each such complement of devices. For example, as shown in FIG. 9, servers HPC2 and R2D2 have been designated for association with one group of devices ("Screen 1") whereas servers HPC1 and NOSTROMON have been designated for association with another group of devices ("Screen 2") and so on. The helper PC program thus establishes a running set of servers associated with the user's location. Within such running set, there may be none, one or more than one server associated with a particular group of I/O devices and hence with a particular user port. If there is more than one server associated with a particular group of I/O devices (e.g., Screen 1), the server at the top of list for that group (HPC2 in FIG. 9) is active, whereas all other servers are inactive. Also, the connection to any port may be designated either as view-only, where only the video output is connected to the user location, or as bi-directional, with connections for video output and user input (keyboard and mouse). A choice between view-only and bi-directional connection may be made by the user. Also, the table of rights stored in the database may give the particular user only the right to establish a view-only connection to a particular server and not the right to establish a bi-directional connection.

Once the user has input a running list of servers, the user inputs a command to the helper PC to implement the connection. Helper PC 202 communicates this command through LAN 206 to switch control computer 200 and enters the appropriate information representing the new running list into database 202. Switch control computer 200 issues disconnect commands similar to the CONNECT VIDEO and CONNECT KEY commands discussed above which cause the switch 70 to disconnect helper PC 202 from the particular user port which was connected to the helper PC. The switch control computer then issues the CONNECT VIDEO commands and CONNECT KEY commands as appropriate to connect the active devices specified in the running list for a particular user to input and output devices at the user's location. For example, where the running list input through the helper PC specifies a video-only link between computer 20A and screen 40B (user port 157B) and also specifies a bi-directional link between server 206, the group of devices (monitor 40C, keyboard 42C and mouse 44C) associated with receiver 48C and user port 157C, the switch control computer will issue a CONNECT VIDEO command to connect server 20A with user port 157B and will issue both CONNECT VIDEO and CONNECT KEY commands to connect server 20C with user port 157C.

At this juncture, the user is in communication with one or more server computers. While the user is interacting with server computers, the user can send a further helper command, referred to herein as an intra-session helper command, by entering alt-break followed by a tab key. The helper command is handled in the same manner as the startup helper command discussed above. The intra-session helper command includes the attention sequence (Alt-break) followed by depression of the TAB key. Once again, the user interface processor associated with the user port receiving the command responds to the attention sequence by trapping the following keystroke signals associated with the tab key press and forwarding a the command to the control card, which sends the intrasession helper command signal to the switch control computer. In response to the intra-session helper command, the switch control computer 200 disconnects the group of I/O devices at the user's location which originated the command from a server and connects the user port associated with that group of devices to the helper PC in the substantially same way as discussed above. However, the switch control computer signals the helper computer that the connection is an intra-session request rather than a startup request. Therefore, the helper computer does not enter the user identification routine discussed above. Instead, the helper computer retrieves the identity of the user who is currently signed on at the user location associated with the user port where the command originated.

Also, while the user is interacting with the servers, the user can enter action codes different from the helper codes. The action codes include the alt-break attention sequence followed by one or more keystrokes other than the tab key or enter key. These action codes are captured by the processor 152 associated with the user port 157 in exactly the same manner as discussed above with reference to the helper codes. Here again, the processor passes the keystroke following the attention (alt-break) sequence to the command TDM module of the user interface card which forwards the keystroke signal to the control card 142 of the user interface chassis. The control card passes a signal along the serial connection 174 giving the overall user port address. The action codes are as follows:

Alt-break plus up arrow or alt-break plus down arrow: Shift among servers associated with the particular user port. This causes the switch control computer to disconnect the currently active server from the particular user port where the action code was entered and to connect an inactive server designated in the running list for the same user port. In this regard, where more than one server is designated for a particular port in the running set of servers, the database treats these servers as an ordered but circular stack, so that the first server in the stack follows after the last server in the stack. For example, if servers designated as A, B, C and D are in the stack in that order, and server B is currently active, Alt-Break with up-arrow will make server A active, whereas Alt-Break with down-arrow will make server C active. If server D is active, Alt-Break with down arrow will make server A active, whereas Alt-Break with up arrow will make server C active.

Alt-break plus left arrow or right arrow—This causes the switch control computer to shift the keyboard and mouse connection to a different server port among the currently active server ports associated with the same user location. For example, assume that server 20a is connected to the keyboard and video display of user port 157C, whereas server 20b has a video-only connection to user port 157B, both user ports being associated with user location 46B. If an alt-break left arrow sequence is received on user port 157C, the keyboard and mouse of port 157C would be disconnected from server 20a and reconnected to server 20b. The Alt-break right arrow sequence would be processed in the same manner, to connect the keyboard to a different server. These command effectively shifts the effects of the control input to a server associated with a different screen. Because these commands are analogous to the change-focus command in a windowed programming environment, they are referred to herein as change-focus commands.

Stated another way, for each user location having more than one user port, and hence more than one output device, the running set of servers is maintained as a two-dimensional matrix, with a number of columns equal to the number of user ports and with the stack of servers for each user port constituting one column. This matrix is established by the helper computer when the users selects the set of servers during operation of the helper computer. The particular column where the keyboard is connected is the current column. The up arrow or down arrow sequence moves both the keyboard and video connections up or down the current column, so that the user can pick a new active server for interaction with the keyboard and video. The left arrow and right arrow sequences moves the keyboard and mouse connection to a different column, and thus select a new current column and shifts the effects or focus of control inputs applied through the keyboard and mouse into the active server in the new column.

The server computer also takes account of the user's authorized level of access to particular servers, to preclude a user from gaining unauthorized access by use of action commands. The switch control computer may access the database to determine the identity of the user connected to a particular port, and retrieve that user's access level for a particular server denoted by an action command, and grant or deny access based on such comparison. Preferably, however, when the helper computer establishes the matrix of servers for a particular user location and hence for the particular user at that location, the helper computer may denote each server as either full-access or video-only access. The server computer can use these indications in the matrix defining the running set, and hence need not refer to the data defining the individual user or to the privileges tables for individual users in the larger database.

These action codes allow the user to switch among the various servers and to move the outputs of the various servers to convenient locations at his work location without invoking the helper PC. The system thus provides simple commands for performing simple, intuitive operations such as shifting among a few servers on the active list or shifting servers around among different display monitors. However, the user always the option of accessing the helper PC. The user need not rely on his own memory to find appropriate servers. Because all of the helper codes and action codes are captured at the user interface chassis, the same cabling which carries the data input by the user can carry the action codes and helper codes. There is no need to provide separate command wiring between the various the user locations and the central location of the switch.

Additional users can connect to the system in the same manner. The program running on switch control computer switch server 200 maintains separate threads associated with each user location. The helper PCs are treated as shared resources by the program running on the switch control computer or switch server 200. If a user seeks access to a helper PC while all helper PCs currently occupied, the switch control computer will block such access and will display a message to the user indicating that the helper PC is currently unavailable. A separate device for generating an apology message and providing the appropriate video output with the apology message may be connected to a server port 80 to provide this message. This output can be connected to all user locations which have requested access to the helper but which have not yet been connected to the helper. The switch control computer may act as the apology server. Alternatively, the apology server may be a computer programmed to display educational messages to the users while they are waiting to connect with a helper computer. The program on the switch control computer will allow numerous users to have video or output only access to any one server 20, but will only allow one user at a time to have keyboard or input access to a particular server.

The administration PC 204 can be used to perform tasks such as updating the database when the servers 20 or helper computers 202 are installed and updating user profiles. The administration computer may also be connected into a server port 80 of switch 70 so that a user having appropriate privileges can gain access to the administration PC through switch 70.

The RS 232 data communications ports provided on the control cards can be used for service and maintenance procedures. For example, a terminal or computer connected to these ports can be used to send commands to an individual control card to make or break a connection to a particular server port.

The various elements of switch 70 can be provided with status and fault reporting features. For example, each of the matrix cards is arranged to report its status and to report successful or unsuccessful operations, such as successful or unsuccessful connection and disconnection, to the microprocessor in the control card of the chassis. The various microprocessors are arranged to send error reporting signals to the switch control computer. The switch control computer may handle mew reports according to a variety of rules depending upon factors such as the nature of the new error report and previous error reports. These rules may be explicitly coded rules set by a program, or may incorporate learned behaviors using techniques commonly referred to as "artificial intelligence". For example, if a particular matrix card reports a failure to disconnect a particular user's data channel from the data bus of the backplane, the switch control computer may repeat the disconnect command. If the repeated disconnect command fails after a selected number of retries, or if a certain percentage of disconnect or connect commands fail, the switch control computer may treat the matrix card as defective and may issue a command to the control card to disable that matrix card, as by disconnecting the entire card from the power supply.

The rules for deciding which action to take in response to which error reports will vary with the application and the goals of the system administrator. For example, in an environment where security is paramount, and where entry of garbled data due to connection of two keyboards to one server could pose a substantial risk to the overall mission, the rules may call for disabling a matrix card, or even the entire system, in response to only a few error reports. In an educational environment where the system is being used to train operators in the use of publicly available software, the inconvenience caused by tolerating a few erroneous connections may be less significant than the inconvenience caused by shutting down part or all of the system. Thus, there is no particular set of error-handling rules which is best for all applications. Desirably, the switch control program utilizes an event-reporting and event-logging capability, such as those included in the Windows NT® operating system. The event handler in the operating system may be arranged to take appropriate actions, such as establishing a connection to a service facility and sending the appropriate report.

The system discussed above can be configured for an unlimited number of servers. Thus, any desired number of server chassis 72 can be added to the system. However, each server interface chassis can only accommodate 512 user channels, i.e., 32 user channels per matrix card, and up to 16 matrix cards per server interface chassis. As discussed above with reference to FIG. 5, the server interface cards 78 are provided with expansion connectors 92. These expansion connectors can be used to connect additional server interface chassis as illustrated in FIG. 10. A second stack of server interface chassis 72' is connected alongside of the first stack of chassis 72. The additional server interface chassis are provided with server interface cards 78' similar to the server interface cards 78 discussed above. The server video and data channels coupled to each server interface card 78 in a chassis 72 is coupled through the expansion port 92 of that card to the inputs 93 of a server interface card 78' in the corresponding chassis 72' in the second stack. The video and data channels are coupled to the backplanes of the chassis 72' in substantially the same manner as discussed above. The second stack of chassis 72' can accommodate an additional 512 user channels, using matrix cards as discussed above. The server interface cards 78' of the second stack may have additional expansion ports 92', so that the server video and data channels can be coupled to still further chassis. Thus, the system can accommodate an essentially unlimited number of users.

Numerous variations and combinations of the features discussed above can be utilized without departing from the invention as defined by the claims. For example, the particular keystroke sequences selected to designate command codes in the embodiment discussed above are arbitrary; other keystroke sequences can be employed. Desirably, the keystroke sequences used to designate command codes are those which do not occur during normal interaction between the user and a server. Also, the particular formats for video and data transmission used in the preferred embodiments discussed above are not essential to the invention. Also, the computers may have video output formats other than the VGA format discussed above, and may have different keyboard and mouse output and input formats. Any of these different formats can be utilized. Further, input and output devices at some or all of the user locations named include devices other than video monitors, keyboards and mice. For example, some or all of the user locations may incorporate printers, audio speakers, tactile feedback devices or other computer-controllable devices such as computer controlled numerical machine tools, "solid modeling" devices and the like. In each case, the communication links routed through the switch would be configured to carry the information normally sent by the computer to such devices. Also, the input devices may include more complex input devices such as joy sticks or controls which simulate the control inputs to a vehicle as, for example, simulated pilots yokes and rudder pedals for flight simulation. These devices may include features such as force feedback, vibration and the like controlled by output sent from the computer. Here again, the communications channels routed through the switch would be configured to carry the necessary information. In the embodiments discussed above, the switch acts on electrical signals. However, where the output and input are routed along optical communications such as fiber optic communication channels, the switching device may include appropriate components for switching optical signals. Further, the communication links between the computers and the switch and between the user location devices and the switch need not be hard-wired connections. For example, these links can be replaced by appropriate RF or optical communications links. Also, the particular schemes for connection between the switch control computer and the elements of the switch can be varied. For example, the RS 422 serial ports of the control cards on the server interface chassis can be connected to individual communications ports on the switch control computer, instead of being connected together in a common channel as described above. Data communication schemes other than serial communication channels can be employed.

As these and other variations and combinations of the features discussed above can be utilized without departing from the invention as defined by the claims, the foregoing description of the preferred embodiment should be taken by way of illustration rather than by way of limitation of the invention as defined by the claims.

What is claimed is:

1. A method for selecting one of a plurality of server computers within a KVM system for controlling remotely located server computers with output and input devices at a plurality of user locations, said method comprising:

receiving input signals sent by input devices included in said input and output devices at user locations, conveying input signals from said input devices to server computers associated with said user locations and conveying output signals from such server computers to output devices at said user locations; and operating an interactive computer program in a supervisory computer system in response to predetermined input signals via said input devices at any of said user locations, said interactive computer program having a graphical user interface and facilitating selection of one or more of said server computers by a user at said user location that sent said predetermined input signals by providing said user with a listing via said graphical user interface of appropriate ones of said server computers, organization of content of said listing being in accordance with at least one user provided criteria.

2. The method of claim 1, wherein said supervisory computer system records information about usage of said server computers by a user, recorded usage information being displayable using said graphical user interface.

3. The method of claim 1, wherein different types of computer programs are available on different ones of the server computers and the criteria arranges said server computers into groups in accordance with the available computer programs.

4. The method of claim 1, wherein said interactive program allows a user at a particular user location in said plurality of user locations to select one or more server computers for connection to that particular user location.

5. The method of claim 1, wherein said interactive program run by the supervisory computer system allows a user at a particular user location in said plurality of user locations to select one or more server computers for connection to another user location in said plurality of user locations.

6. The method of claim 1, wherein the supervisory computer system includes routines which require each user to enter an indication of his/her identity along wit a secret password associated with that identity.

7. The method of claim 1, wherein users at the plurality of user locations have different rights with respect to accessing the server computers and said appropriate ones of said server computers are those server computers for which a given user at said user location has the right to access.

8. The method of claim 1, wherein said receiving and conveying are performed at said supervisory computer system, said input signals being transmitted on a common channel from said user locations to said supervisory computer system.

9. The method of claim 1, said method further comprising the step of instructing switching devices to connect or disconnect connections between said one or more selected server computers and said input/output devices in response to said input signals.

10. The method of claim 9, wherein said instructing is performed by a switching circuit within said supervisory computer system.

11. The method of claim 9, said method further comprising the step of maintaining data defining a running set of said server computers devices for each said user location, said instructing further including switching said input/output device that supplied said input signals between said server computers.

12. A method for selecting one of a plurality of server computers within a KVM system for controlling remotely located server computers with output and input devices at a plurality of user locations, said method comprising:

receiving input signals sent by input devices included in said input and output devices at user locations, conveying input signals from said input devices to server computers associated with said user locations and conveying output signals from such server computers to output devices at said user locations; characterized by detecting one or more predetermined helper codes in such input signals connecting a supervisory computer system to the input and output devices at the user location that sent such helper codes;

running computer program in said supervisory computer system that interacts with the connected input and output devices, said computer program facilitating selection of one or more of said server computers by a user at said user location by providing said user with a listing of selected ones of said server computers, content of said list being organizeable in accordance with at least one user provided criteria.

13. The method of claim 12, wherein said supervisory computer system records information about usage of said server computers by a user, recorded usage information being displayable using a graphical user interface.

14. The method of claim 12, wherein different types of computer programs are available on different ones of the server computers and the criteria arranges said server computers into groups in accordance with the available computer programs.

15. The method of claim 12, wherein said interactive program allows a user at a particular user location in said plurality of user locations to select one or more server computers for connection to that particular user location.

16. The method of claim 12, wherein said interactive program run by the supervisory computer system allows a user at a particular user location in said plurality of user locations to select one or more server computers for connection to another user location in said plurality of user locations.

17. The method of claim 12, wherein the supervisory computer system includes routines which require each user to enter an indication of his/her identity along with a secret password associated with that identity.

18. The method of claim 12, wherein users at the plurality of user locations have different rights with respect to accessing the server computers and said predetermined ones of said server computers are those server computers for which a given user at said user location has the right to access.

19. The method of claim 12, wherein said receiving and conveying are performed at said supervisory computer system, said input signals being transmitted on a common channel from said user locations to said supervisory computer system.

20. The method of claim 12, said method further comprising the step of instructing a switching device to connect or disconnect connections between said one or more selected server computers and said input/output devices in response to said input signals.

21. The method of claim 20, wherein said instructing is performed by a switching circuit within said supervisory computer system.

22. The method of claim 20, said method further comprising the step of maintaining data defining a running set of said server computers for each said user location, said instructing further including switching said input/output device that supplied said input signals between said server computers.

23. A method for selecting one of a plurality of server computers with output and input devices at user locations remote from said server computers for KVM control of said server computers, said method comprising:

receiving input signals sent by said input devices at user locations for KVM control of said server computers, conveying said input signals from said input devices to server computers associated with said user locations and conveying output signals from such server computers to output devices at said user locations; and selectively invoking an interactive computer program in a supervisory computer system through a given set of commands from said input devices, said interactive computer program being operable to graphically display, by way of a graphical user interface, a selectively organizeable listing of at least a group of said plurality of server computers which are available for connection with said input and output devices.

24. The method of claim 23, wherein said user may select connection to one of said plurality of servers in said group utilizing said graphically displayed listing.

25. The method of claim 24, wherein said interactive computer program responsive to selections of said graphically displayed listing communicates to one or more switches in order to make automatic connection between said server computers and said remote input and output devices.

26. The method of claim 25, wherein the interactive computer program couples to said one or more switches by way of a network connection.

27. The method of claim 23, wherein said supervisory computer system records information about usage of said server computers by a user, recorded usage information being displayable using said graphical user interface.

28. The method of claim 27, wherein one or more of said input or output devices communicate in said KVM system via a wireless interface.

29. A method of operating a KVM system in order to control one of a plurality of server computers through the use of input and output devices, said input and output devices remotely located from said server computers, said method comprising:
   viewing a list of server computers within said KVM system by invoking an interactive computer program in a supervisory computer system, wherein organization of content of said list is selectable by a remote user;
   selecting connection to one or more of said server computers utilizing said list, said selection being made by said devices remotely located from said server computers.

30. The method of claim 29, wherein said list is arrangeable according to a criteria in the group consisting of location and function.

31. The method of claim 30, wherein said list is part of an interactive computer program having a graphical user interface, wherein the interactive computer program provides differing access rights to said servers depending on identity of a user.

32. The method of claim 31, wherein said interactive computer program responsive to selections of said graphical user interface communicates to one or more switches in order to make connection between said server computers and said remote input and output devices.

33. The method of claim 29, wherein said supervisory computer system records information about usage of said server computers by a user, recorded usage information being displayable using said graphical user interface.

34. A KVM system for selecting one of a plurality of server computers with input and output devices locatable at a plurality of user locations remote from said server computers, said KVM system operable to receive input signals sent by input devices included in sets of input and output devices at user locations, and to convey input signals from said input devices to server computers associated with said user locations and conveying output signals from such server computers to output devices at said user locations; said system comprising:
   a supervisory computer system having an interactive computer program operated in response to predetermined input signals provided by said input devices at any of said plurality of user locations;
   a graphical user interface included in said interactive computer program and facilitating selection of one or more of said server computers by a user at said user location that sent said predetermined input signals by providing said user with a listing via said graphical user interface of appropriate ones of said server computers, organization of content of said listing being in accordance with at least one user provided criteria.

35. The system of claim 34, wherein said interactive computer program responsive to selections made via said graphical user interface communicates to one or more switches in order to make connection between said server computers and said remote input and output devices.

36. The system of claim 34, wherein one or more of said input or output devices communicate in said KVM system via a wireless interface.

37. The system of claim 34, wherein said supervisory computer system records information about usage of said server computers by a user, recorded usage information being displayable using said graphical user interface.

38. The system of claim 34, wherein the interactive computer program couples to said one or more switches by way of a network connection.

39. A KVM system for selecting one of a plurality of server computers for KVM control thereof through the use of input and output devices, said input and output devices remotely located from said server computers, said system comprising:
   a supervisory computer system including an interactive computer program for viewing a list of servers within said KVM system;
   a graphical user interface operable for viewing said list of servers, wherein organization of content of said list is selectable by a user,
   said graphical user interface in connection with said interactive computer operable to provide selective connection to one or more of said servers utilizing said list, said selection being made by said devices remotely located from said server computers.

* * * * *